(12) United States Patent
Brewster (10) Patent No.: US 9,637,041 B2
(45) Date of Patent: May 2, 2017

(54) VARIABLE STIFFNESS COMPRESSION APPARATUS, SYSTEMS AND METHODS OF USING THE SAME

(71) Applicant: Holland LP, Crete, IL (US)

(72) Inventor: John B. Brewster, Homewood, IL (US)

(73) Assignee: Holland, L.P., Crete, IL (US)

(*) Notice: Subject to any disclaimer, the term of this patent is extended or adjusted under 35 U.S.C. 154(b) by 0 days.

(21) Appl. No.: 14/720,246

(22) Filed: May 22, 2015

(65) Prior Publication Data
US 2016/0339828 A1  Nov. 24, 2016

(51) Int. Cl.
*B60P 7/08* (2006.01)
*B61D 45/00* (2006.01)
*B63B 21/00* (2006.01)

(52) U.S. Cl.
CPC ............. *B60P 7/08* (2013.01); *B60P 7/0823* (2013.01); *B60P 7/0838* (2013.01); *B60P 7/0861* (2013.01); *B61D 45/003* (2013.01); *B63B 2021/005* (2013.01)

(58) Field of Classification Search
CPC ......... B60P 7/08; B60P 7/0838; B60P 7/0823; B60P 7/0861; B61D 45/003; B63B 2021/005
USPC ......... 410/103, 38; 267/141.1, 140.3, 72, 73
See application file for complete search history.

(56) References Cited

U.S. PATENT DOCUMENTS

| | | | | |
|---|---|---|---|---|
| 99,320 A * | 2/1870 | Jones | ........................ | F16F 3/04 267/70 |
| 395,297 A * | 12/1888 | Skiles | ..................... | B60C 27/12 267/72 |
| 608,344 A * | 8/1898 | Nesmith | .................. | B60C 27/12 213/208 |
| 1,785,323 A * | 12/1930 | Persinger | ................ | B60C 27/12 152/219 |
| 2,494,004 A * | 1/1950 | Rydner | ................ | B61D 45/008 267/70 |
| 2,698,752 A * | 1/1955 | Cole | ..................... | B60P 7/0838 267/72 |
| 3,140,850 A * | 7/1964 | Packard | .................. | B60P 3/075 403/43 |
| 3,402,925 A * | 9/1968 | Schwiebert | ........... | F16F 1/3732 267/141 |
| 3,430,981 A * | 3/1969 | Tarantola | .................. | F41A 9/87 280/79.3 |
| 3,804,028 A * | 4/1974 | O'Leary | .............. | B61D 45/003 410/40 |

(Continued)

FOREIGN PATENT DOCUMENTS

IT    WO 03106251 A1 * 12/2003 ............. B63B 21/04

*Primary Examiner* — Eret McNichols
(74) *Attorney, Agent, or Firm* — Scherrer Patent & Trademark Law, P.C.; Stephen T. Scherrer; Monique A. Morneault (57) ABSTRACT

The present invention comprises an apparatus for use in line with a chain or a strap tie-down assembly. When the chain or strap tie-down assembly is tightened on a commodity to prevent movement of the same during shipping, the apparatus compresses and stretches. During transport, if the commodity loosens and creates slack in the chain or tie-down assembly, the apparatus may decompress and shorten, thereby taking up the slack and maintaining tension in the chain or tie-down assembly to prevent or minimize loosening and damage of the commodity.

20 Claims, 4 Drawing Sheets

(56) References Cited

U.S. PATENT DOCUMENTS

| | | | | |
|---|---|---|---|---|
| 3,930,345 A * | 1/1976 | Kurzenberger | B60P 7/0823 | 248/499 |
| 3,957,285 A * | 5/1976 | Schlaeger | B60P 7/0861 | 267/169 |
| 4,314,783 A * | 2/1982 | Parnell | B61D 45/007 | 254/247 |
| 4,360,299 A * | 11/1982 | Nadherny | B60P 7/0838 | 410/100 |
| 4,360,300 A * | 11/1982 | Nadherny | B60P 7/0838 | 410/100 |
| 4,373,841 A * | 2/1983 | Adler | B61D 45/001 | 410/100 |
| 4,770,578 A * | 9/1988 | Coleman | B60P 7/0823 | 410/120 |
| 6,112,691 A * | 9/2000 | Bajeli | B63B 21/20 | 114/215 |
| 6,336,626 B1 * | 1/2002 | Zucchini | B68C 3/00 | 267/70 |
| 6,345,583 B1 * | 2/2002 | Thackston | B63B 21/20 | 114/213 |
| 9,102,259 B2 * | 8/2015 | Brewster | B60P 7/0823 | |
| 9,266,462 B2 * | 2/2016 | Miller | B60P 7/0823 | |
| 2006/0037178 A1 * | 2/2006 | Sulhoff | B60P 7/0823 | 24/68 CD |
| 2016/0159268 A1 * | 6/2016 | Davies | B60P 7/0823 | 24/70 R |

\* cited by examiner

VARIABLE STIFFNESS COMPRESSION APPARATUS, SYSTEMS AND METHODS OF USING THE SAME

TECHNICAL FIELD

The present invention comprises an apparatus for use in line with a chain or a strap tie-down assembly. When the chain or strap tie-down assembly is tightened on a commodity to prevent movement of the same during shipping, the apparatus compresses and stretches. During transport, if the commodity loosens and creates slack in the chain or tie-down assembly, the apparatus may decompress and shorten, thereby taking up the slack and maintaining tension in the chain or tie-down assembly to prevent or minimize loosening and damage of the commodity.

BACKGROUND

Commodities are often transported from one location to another, especially via train lines or vehicles. Often, it is important to ensure that the commodities are effectively secured during transport to minimize movement of the commodities. Specifically, a railcar experiences lateral, longitudinal, and even vertical movement as the railcar travels. For example, railcars are typically coupled together, and this coupling may cause the railcars to jostle and move erratically. In addition, as a train travels from one location to another, railcars may experience erratic movement, such as when a train accelerates and decelerates, and further due to irregularities in the track. Thus, commodities that are not tied down securely may also move or become jostled, causing damage to the commodities.

Chains and other tie-down assemblies, including links, carabineers, ratchets, and other like apparatuses are typically utilized to attempt to ensure that commodities are tied down securely during transport of the same. Often, chains and/or other tie-downs are either linked to the railcar or vehicle itself and wrapped around the commodity, or linked directly to the commodity and to the railcar or vehicle. It is a goal to tie-down the commodity so that the commodity does not move during shipment.

However, it is often the case that despite the attention to tying down the commodities using chains and/or tie-down assemblies, commodities may shift during transport, which may lead to the development of slack in the chain or tie-down assembly. In such a situation, the commodity may be subject to additional movement or jostling during shipment, potentially leading to damage of the commodity.

A need, therefore, exists for an apparatus that may take up loose slack of chains and tie-down assemblies. Specifically, a need exists for an apparatus to take up loose slack of chains and tie-down assemblies during shipment of a commodity tied down by the chains or tie-down assemblies.

Moreover, a need exists for an apparatus that may effectively be compressed and elongated during compression. Specifically, a need exists for an apparatus that may decompress and shorten when slack develops in a chain or tie-down assembly.

In addition, a need exists for an apparatus that may compress and elongate, and decompress and shorten and having significant strength to withstand substantial compression forces. Moreover, a need exists for an apparatus utilized to take up slack in a chain or tie-down assembly that may be easily linked in-line with the chain or tie-down assembly.

Heretofore, it is known to utilize compression elements in chains or tie-down assemblies that may compress or decompress based on tension applied or unapplied, respectively. However, prior solutions have limited application because only single compressible non-metallic material is used leading to a compressible material that is constant as opposed to variable. This severely limits the properties of the compression apparatus. A need, therefore, exists for a compression apparatus that may be tailored to specific needs. More specifically, a need exists for a compression apparatus that has variable stiffness elements so that the compression apparatus may have better applicability in different tie-down situations.

SUMMARY OF THE INVENTION

The present invention comprises an apparatus for use in line with a chain or a strap tie-down assembly. When the chain or strap tie-down assembly is tightened on a commodity to prevent movement of the same during shipping, the apparatus compresses and stretches. During transport, if the commodity loosens and creates slack in the chain or tie-down assembly, the apparatus may decompress and shorten, thereby taking up the slack and maintaining tension in the chain or tie-down assembly to prevent or minimize loosening and damage of the commodity.

To this end, in an embodiment of the present invention, a compression apparatus is provided. The compression apparatus comprises: a body formed by a first U-shaped bolt and a second U-shaped bolt disposed in an inverted position relative to the first U-shaped bolt, the body having a first end and a second end, wherein a first cap is disposed at the first end, a second cap is disposed at the second end and a first internal space is disposed between the first cap and the second cap, wherein legs of the first U-shaped bolt are disposed through the first cap and the second cap and further wherein the legs of the first U-shaped bolt are rigidly held to the second cap, wherein legs of the second U-shaped bolt are disposed through the second cap and the first cap and further wherein the legs of the second U-shaped bolt are rigidly held to the first cap; a first compressible material within the first space between the first cap and the second cap; wherein the first compressible material has first and second internal elements, wherein the first internal element contributes to the compressibility of the compression apparatus at a first force applied to the compression apparatus and further wherein a combination of the first internal element and the second internal element contributes to the compressibility of the compression apparatus at a second force applied to the compression apparatus.

In an embodiment, the first and second internal elements have different stiffness constants.

In an embodiment, wherein the legs of at least the first U-shaped bolt and the second U-shaped bolt are threaded.

In an embodiment, the legs of the first U-shaped bolt and the second U-shaped bolt are threaded, and further wherein the legs of the first U-shaped bolt and the second U-shaped bolt are rigidly held to the second and first caps, respectively, with nuts.

In an embodiment, the first internal element is longer in length than the second internal element and fills more of the first internal space between the first and second caps than the second internal element.

In an embodiment, the first internal element has an open volume therein, and the second internal element is disposed within the open volume within the first internal element.

In an embodiment, the first internal element has the same stiffness constant as the second internal element.

In an embodiment, the first internal element has a different stiffness constant as the second internal element.

In an embodiment, the compression apparatus further comprises: a center guide plate disposed between the first cap and the second cap forming the first internal space between the first cap and the center guide plate and a second internal space between the second cap and the center guide plate.

In an embodiment, the compression apparatus further comprises: a second compressible material disposed within the second internal space between the second cap and the center guide plate, wherein the second compressible material comprises a first internal element and a second internal element, wherein the first internal element of the second compressible material contributes to the compressibility of the compression apparatus at the first force applied to the compression apparatus and further wherein a combination of the first internal element and the second internal element of the second compressible material contributes to the compressibility of the compression apparatus at the second force applied to the compression apparatus.

In an alternate embodiment of the present invention, a system is provided. The system comprises the compression apparatus further comprising: a first tie-down element extending from the first U-shaped bolt.

In an embodiment, the first tie-down element is a chain.

In an embodiment, the system further comprises: an item to be tied down, wherein the first tie-down element secures the item and prevents movement during transport thereof.

In an embodiment, the system further comprises: a first tie-down element extending from the first U-shaped bolt; and a second tie-down element extending from the second U-shaped bolt.

In an embodiment, the first and second tie-down elements are chains.

In an embodiment, the system further comprises: an item to be tied down, wherein at least one of the first and second tie-down elements secures the item and prevents movement during transport thereof.

In an alternate embodiment of the present invention, a method of securing an item for transport is provided. The method comprises the steps of: providing an item to be secured for transport; providing a tie-down element and securing the item with the tie-down element; connecting a compression apparatus to the tie-down element, said compression apparatus comprising a first internal element and a second internal element, wherein the first internal element contributes to the compressibility of the compression apparatus at a first force applied to the compression apparatus and further wherein a combination of the first internal element and the second internal element contribute to the compressibility of the compression apparatus at a second force applied to the compression apparatus; applying a first force to the compression apparatus, wherein the compression apparatus has a first compressibility at the first force; and applying a second force to the compression apparatus, wherein the compression apparatus has a second compressibility at the second force that is a combination of the stiffness constants of the first and second internal elements.

In an embodiment, the first tie-down element is secured to a first end of the compression apparatus.

In an embodiment, the method further comprises the steps of: providing a second tie-down element; and securing the second tie-down element to the compression apparatus.

In an embodiment, the second tie-down element is secured to a second end of the compression apparatus.

It is, therefore, an advantage and objective of the present invention to provide an apparatus that may take up loose slack of chains and tie-down assemblies.

Specifically, it is an advantage and objective of the present invention to provide an apparatus to take up loose slack of chains and tie-down assemblies during shipment of a commodity tied down by the chains or tie-down assemblies.

Moreover, it is an advantage and objective of the present invention to provide an apparatus that may effectively be compressed and elongated during compression.

Specifically, it is an advantage and objective of the present invention to provide an apparatus that may decompress and shorten when slack develops in a chain or tie-down assembly.

In addition, it is an advantage and objective of the present invention to provide an apparatus that may compress and elongate, and decompress and shorten that is significantly strong to withstand significant compression forces.

Moreover, it is an advantage and objective of the present invention to provide an apparatus utilized to take up slack in a chain or tie-down assembly that may be easily linked in-line with the chain or tie-down assembly.

In addition, it is an advantage and objective of the present invention to provide a compression apparatus that may be tailored to specific needs.

More specifically, it is an advantage and objective of the present invention to provide a compression apparatus that has variable stiffness elements so that the compression units may have better applicability in different tie-down situations.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention comprises an apparatus for use in line with a chain or a strap tie-down assembly. When the chain or strap tie-down assembly is tightened on a commodity to prevent movement of the same during shipping, the apparatus compresses and stretches. During transport, if the commodity loosens and creates slack in the chain or tie-down assembly, the apparatus may decompress and shorten, thereby taking up the slack and maintaining tension in the chain or tie-down assembly to prevent or minimize loosening and damage of the commodity.

Figure 1:
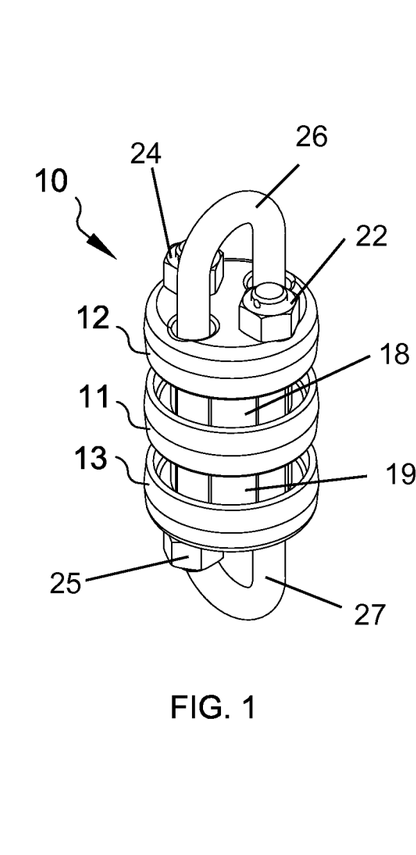
FIG. 1 illustrates an isometric view of a variable stiffness compression apparatus in an embodiment of the present invention.

Now referring to the figures, wherein like numerals refer to like parts, FIG. 1 illustrates an isometric view of a preferred embodiment of the present invention of a compression apparatus 10 in its normal, non-elongated static state. The apparatus may comprise a first U-bolt 26 and a second U-bolt 27 inverted with respect to the first U-bolt 26, with the first and second U-bolts 26, 27 disposed in proximity to each other at roughly ninety degrees to each other.

A first end cap 12 may be disposed at a top end of the apparatus 10 and a second end cap 13 may be disposed on a bottom end of the apparatus 10. A center guide plate 11 may be disposed at a midpoint between the top end and the bottom end of the apparatus 10. The first and second U-bolts may traverse through each of the first and second end caps 12, 13 and the center guide plate 11, thereby maintaining the U-bolts in relative positions to each other. Nuts 22, 24 and 23, 25 may hold the U-bolts in place in their relative positions, and may be tightened onto first and second end caps 12, 13 respectively.

A first internal element 18 may be disposed between first end cap 12 and center guide plate 11, and a second internal element 19 may be disposed between center guide plate 11 and the second end cap 13. The first and second internal elements 18, 19 may be made from a compressible material that may shorten and fill the internal space between the first and second end caps 12, 13 and the center guide plate 11 when compressed by tension forces, as described below.

In use, the apparatus 10 may be disposed in-line with one or more chains or tie-down assemblies. Specifically, a first chain or tie-down (not shown) may be linked to the first U-bolt 26 and a second chain or tie-down (not shown) may be linked to the second U-bolt 27. Thus, the apparatus 10 may directly bear the tension of the chain or tie-down assembly when used to tie-down a commodity.

Figure 2:
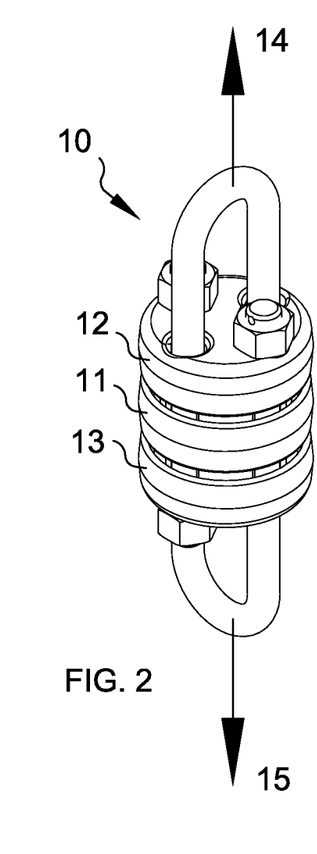
FIG. 2 illustrates an isometric view of a variable stiffness compression apparatus in a compressed and elongated state in an embodiment of the present invention.
Figure 5:
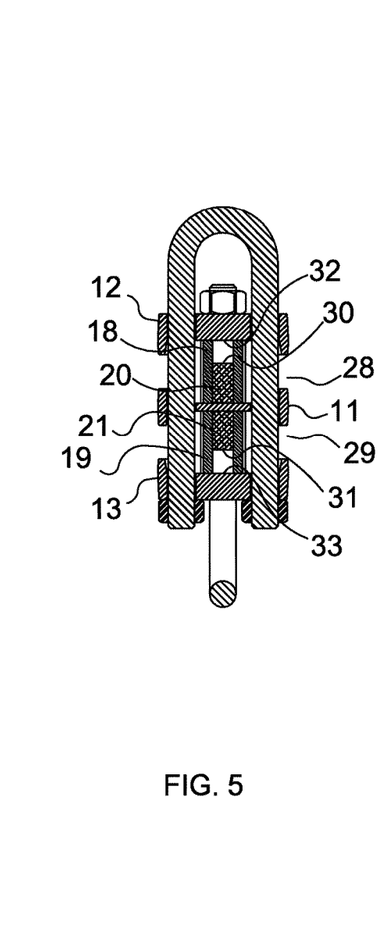
FIG. 5 illustrates a sectional view of a variable stiffness compression apparatus in an uncompressed and shortened state in an embodiment of the present invention.

As illustrated in FIG. 2, the apparatus 10 is shown in a partially or semi-elongated state. Specifically, as stress on the apparatus 10, by tension forces 14, 15 applied to first and second U-bolts 26, 27, the end caps 12, 13 may be forced to travel with their respective U-bolt in respective directions 26, 27. For example, as tension is applied to the first and second U-bolts 26, 27, end cap 12 may travel with U-bolt 27, and end cap 13 may travel with U-bolt 26. Thus, as tension increases on the first and second U-bolts 26, 27, end caps 12, 13 may travel towards center guide plate 11. This action may compress the internal elements 18, 19, respectively, and reduce the gaps 28, 29 (as shown in FIG. 5).

Figure 3:
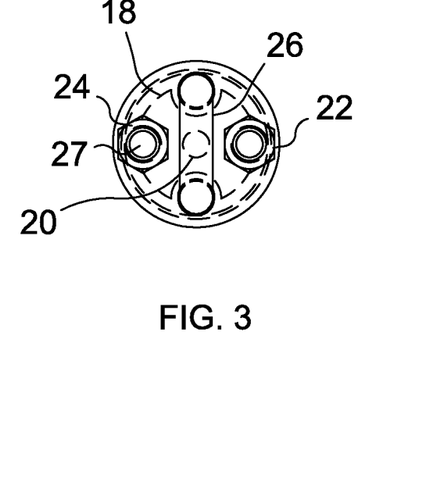
FIG. 3 illustrates a top view of a variable stiffness compression apparatus in an embodiment of the present invention.

FIG. 3 illustrates a top view of the apparatus 10, showing nuts 22, 24 that may be installed on the end of the U-bolt 27, thereby aiding in holding the apparatus 10 assembly together. Internal elements 18, 20 are illustrated in hidden lines to illustrate their respective relationship with other parts.

Figure 4:
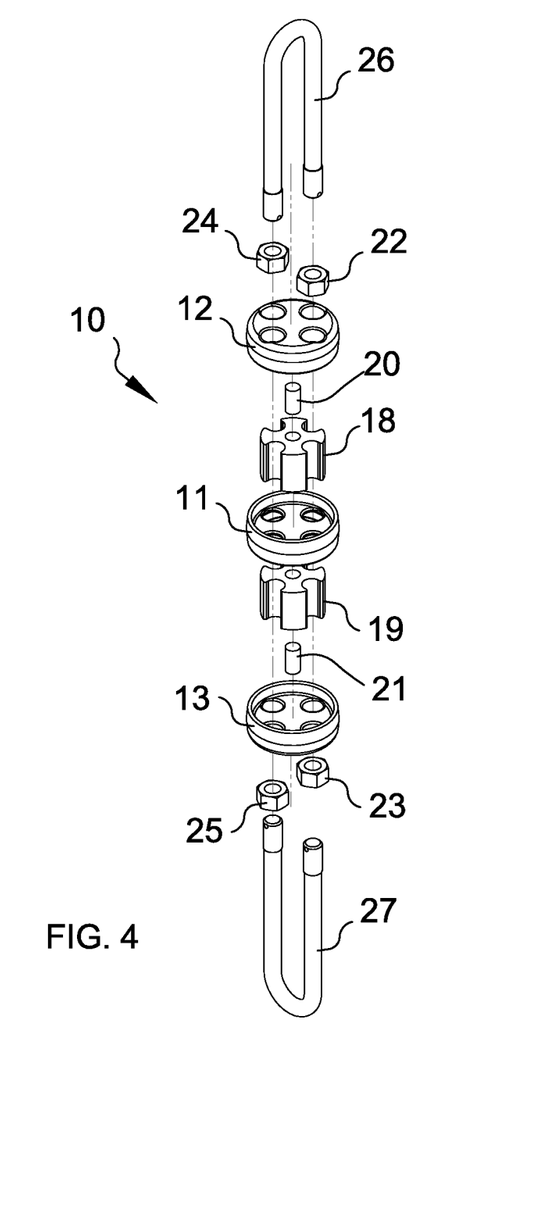
FIG. 4 illustrates an exploded isometric view of a variable stiffness compression apparatus in an embodiment of the present invention.

FIG. 4 illustrates an exploded isometric view of the apparatus 10. The legs of the first and second U-bolts 26, 27 may be inserted through their respective end caps 12, 13. A round and preferably solid, non-metallic element 20 may be disposed in a central hole of the element 18, and this sub-assembly is assembled along the legs of the U-bolt 26. Likewise, the round, preferably solid cylindrical element 21 may be disposed in the central hole of the element 19, and this sub-assembly may be assembled along the legs of U-bolt 27. The legs of the first and second U-bolts 26, 27 may be inserted through the appropriate holes in the center guide plate 11 and further inserted through the other parts, such as the first and second end caps 12, 13, until the threaded ends of the U-bolts 26, 27 protrude through the end caps 12, 13 allowing nuts 22, 24 and 23, 25, respectively, to be installed onto the threaded ends of the U-bolts 26, 27. The nuts 22, 24 and 23, 25, respectively, may effectively hold the apparatus 10 together and prevent it from coming apart. The shape, size and material of the internal components, such as the internal elements 18, 19 and the elements 20, 21, respectively, may be specifically tailored to accommodate the desired performance characteristics of the apparatus 10.

The internal elements 18, 19 and the elements 20, 21 may be disposed together, respectively, to provide a compression material having a variable stiffness. Preferably, the internal elements 18, 19 and the elements 20, 21 may be made from a solid, non-metallic material, such as thermoplastic or rubber. Preferably, the compression material describe herein has a memory such that, when compressed, the compression material deforms but when compression is removed, the compression material returns to its original shape and size. Thus, the compression material as described herein acts as a spring that may allow the apparatus 10 to deform when compressed, but return to its original size and shape when compression forces are decreased or removed.

Figure 6:
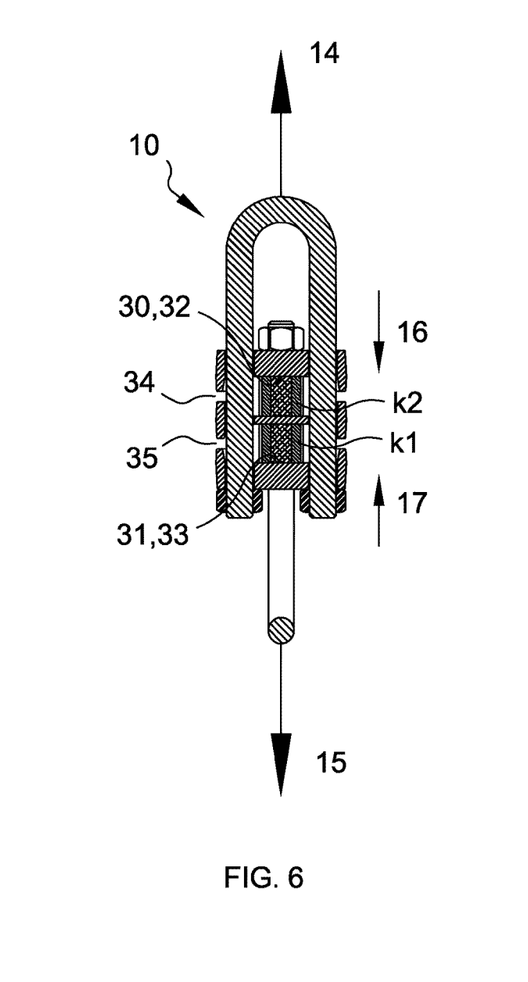
FIG. 6 illustrates a sectional view of a variable stiffness compression apparatus in a semi-compressed and semi-elongated state in an embodiment of the present invention.
Figure 7:
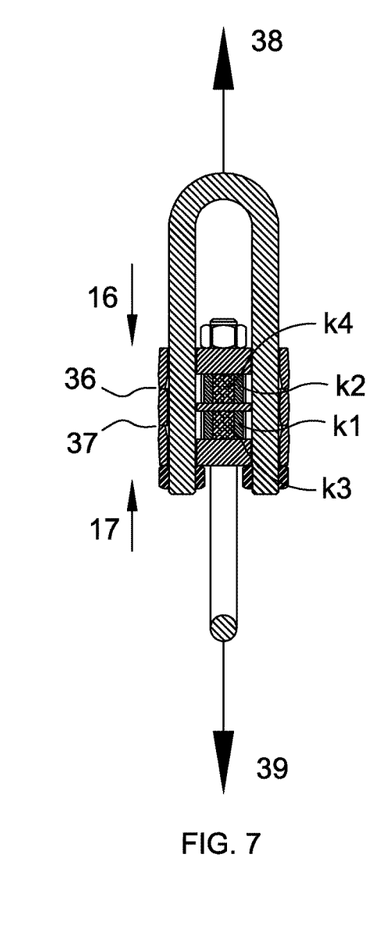
FIG. 7 illustrates a sectional view of a variable stiffness compression apparatus in a compressed and elongated state in an embodiment of the present invention.

FIGS. 5-7 illustrate sectional views of the apparatus 10 progressing from a non-compressed state (FIG. 5) to a partially compressed and partially elongated state (FIG. 6) to a fully compressed and elongated state (FIG. 7). As illustrated in FIG. 5, the round preferably solid cylindrical non-metallic elements 20, 21 may be shorter in length than the internal elements 18, 19. Although the elements 20, 21 are shown as round or cylindrically-shaped, it should be noted that the elements 18, 19 may be any shape so as to accommodate the performance variation of the application desired. As illustrated in FIG. 5, because the elements 20, 21 are shorter than internal elements 18, 19, a space may be formed between surface 30 of element 20 and surface 32 of the end cap 12. Likewise, a space may be formed between surface 31 of element 21 and surface 33 of the end cap 13.

FIG. 6 illustrates apparatus 10 in a partially compressed and partially elongated state, when tension forces 14, 15 are applied to first and second U-bolts 26, 27 in the directions shown in FIG. 6. As tension forces 14, 15 are applied, surfaces 30, 31 for the elements 20, 21, respectively, come into contact with surfaces 32, 33 of the first and second end caps, 12, 13, respectively, thereby eliminating the spaces therebetween. The result of this action may compress the internal elements 18, 19 only and not the elements 20, 21, which may result in the forces 14, 15 being dependent and directly proportional to the inherent compression stiffness $k_2$, $k_1$, respectively, of the elements 18, 19 only. As the apparatus 10 elongates, the gaps 28, 29 are reduced to form reduced gaps 34, 35, as shown in FIG. 6. The reduced gaps 34, 35 may also serve as a visual indicator of the compression and elongation of the apparatus 10.

As the apparatus 10 is compressed into its fully compressed and fully elongated state, as shown in FIG. 7, forces 38, 39 pull on first and second U-bolts 26, 27. As the apparatus 10 is fully elongated, further compression of the elements 18, 19 along with compression of the elements 20, 21 results. Thus, the compression of the apparatus 10 may be dependent upon a combination of the inherent stiffnesses (k2, k4 and k1, k3, respectively) of internal elements 18, 19 and elements 20, 21, respectively. Moreover, fully compressing and fully elongating the apparatus 10 reduces gaps 34, 35 (as illustrated in FIG. 6) to fully reduced/closed gaps 36, 37 (as shown in FIG. 7). As the apparatus 10 elongates from a partially compressed and partially elongated state (as illustrated in FIG. 6) to a fully compressed and fully elongated state (as illustrated in FIG. 7), the apparatus 10 performs differently due to the combination of inherent stiffness constants of the internal elements 18, 19 and elements 20, 21, respectively. Thus, depending on the performance characteristics desired, one may change the performance characteristics of the apparatus 10 by changing the shapes, sizes and materials of internal elements 18, 19 and elements 20, 21, respectively.

For example, while the preferred embodiment of the present invention shows internal elements 18, 19 and elements 20, 21, which may be incorporated within elements 18, 19 respectively, additional or different elements may be utilized to change the compression and elongation features of the apparatus 10. In one embodiment, each internal element utilized may have the same stiffness constant, but may engage and contribute to the overall compressibility of the compression apparatus at different forces applied to the compression apparatus. Alternatively, each internal element utilized may have a different stiffness constant, and thus contribute to the overall compressibility of the compression apparatus differently than the other elements. In either case, the differences between the internal elements allow for variable compression of the compression apparatus at different force applied thereto.

For example, as described herein, because the elements 20, 21 are shorter than the internal elements 18, 19, the stiffness constants of the elements 20, 21 (labeled k2, k1, respectively) do not contribute to the compressibility of the compression apparatus 10 until the space within reaches a pre-determined level, and the end caps 12, 13 begin compressing the elements 20, 21. Therefore, for a portion of the compression of the apparatus 10, only the internal elements 18, 19 contribute to the compressibility thereof. As the tension forces increase, the stiffness constant combination of the internal elements 18, 19 and the elements 20, 21 (k2, k4 and k1, k3, respectively) contribute to the compressibility of the apparatus 10. This may be useful in a situation, for example, such as when a relatively low stiffness is desired for a first amount of tension applied to the compression apparatus, but a higher degree of stiffness is desired for a second amount of tension applied to the compression apparatus.

In another embodiment of the present invention, a compression apparatus (not shown) have only have a single internal space between a first end cap and a second end cap, without a center guide plate at a midpoint between ends of the compression apparatus. Thus, the internal space may have a compression material having two or more internal elements that contribute to the compressibility of the compression apparatus at different applied forces, as described above. Likewise, it is contemplated that two or more center guide plates may be provided to provided additional internal spaces, which may or may not contain additional compression materials for contributing to the compressibility of a compression apparatus, as described herein.

Figure 8:
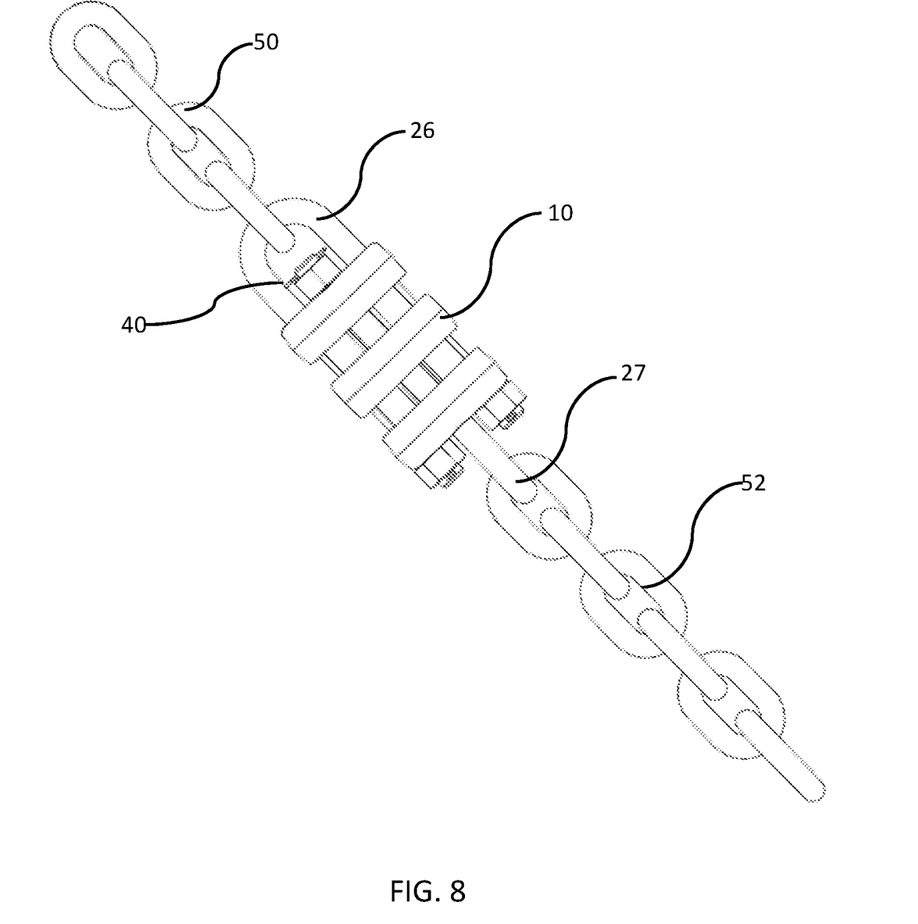
FIG. 8 illustrates a perspective view of a variable stiffness compression apparatus in-line with first and second chains in an embodiment of the present invention.

FIG. 8 illustrates a system of the present invention of the apparatus 10 used in-line with a first chain 50 and a second chain 52. Specifically, U-bolt 26 may be interconnected with a link of the first chain 50 and U-bolt 27 may be interconnected with a link of the second chain 52 and disposed in-line between the first and second chains 50, 52 to tie a commodity (not shown) down, as disclosed above. A cotter pin 40 may be disposed on ends of the legs of the U-bolts 26, 27 to provide security, preventing the removal of the nuts disposed thereon.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

I claim:

1. A compression apparatus comprising:
a body formed by a first U-shaped bolt and a second U-shaped bolt disposed in an inverted position relative to the first U-shaped bolt, the body having a first end and a second end, wherein a first cap is disposed at the first end, a second cap is disposed at the second end and a first internal space is disposed between the first cap and the second cap,
wherein legs of the first U-shaped bolt are disposed through the first cap and the second cap and further wherein the legs of the first U-shaped bolt are rigidly held to the second cap,
wherein legs of the second U-shaped bolt are disposed through the second cap and the first cap and further wherein the legs of the second U-shaped bolt are rigidly held to the first cap;
a first compressible material within the first space between the first cap and the second cap;
wherein the first compressible material has first and second internal elements, wherein the first internal element contributes to the compressibility of the compression apparatus at a first force applied to the compression apparatus and further wherein a combination of the first internal element and the second internal element contributes to the compressibility of the compression apparatus at a second force applied to the compression apparatus,
wherein the first internal element has an open volume therein, and the second internal element is disposed in the open volume within the first internal element.

2. The compression apparatus of claim 1 wherein the first and second internal elements have different stiffness constants.

3. The compression apparatus of claim 1 wherein the legs of at least the first U-shaped bolt and the second U-shaped bolt are threaded.

4. The compression apparatus of claim 1 wherein the legs of the first U-shaped bolt and the second U-shaped bolt are threaded, and further wherein the legs of the first U-shaped bolt and the second U-shaped bolt are rigidly held to the second and first caps, respectively, with nuts.

5. The compression apparatus of claim 1 wherein the first internal element is longer in length than the second internal element and fills more of the internal space between the first and second caps than the second internal element.

6. The compression apparatus of claim 1 wherein the first internal element has the same stiffness constant as the second internal element.

7. The compression apparatus of claim 1 further comprising:
a center guide plate disposed between the first cap and the second cap forming the first internal space between the first cap and the center guide plate and a second internal space between the second cap and the center guide plate.

8. The compression apparatus of claim 7 further comprising:
a second compressible material disposed within the second internal space between the second cap and the center guide plate,
wherein the second compressible material comprises a first internal element and a second internal element, wherein the first internal element of the second compressible material contributes to the compressibility of the compression apparatus at the first force applied to the compression apparatus and further wherein a combination of the first internal element and the second internal element of the second compressible material contributes to the compressibility of the compression apparatus at the second force applied to the compression apparatus.

9. The compression apparatus of claim 8 wherein the first internal element has the same stiffness constant as the second internal element.

10. The compression apparatus of claim 8 wherein the first and second internal elements have different stiffness constants.

11. A system comprising the apparatus of claim 1, further comprising:
a first tie-down element extending from the first U-shaped bolt.

12. The system of claim 11, wherein the first tie-down element is a chain.

13. The system of claim 11, further comprising:
an item to be tied down, wherein the first tie-down element secures the item and prevents movement during transport thereof.

14. The system of claim 11, further comprising:
a first tie-down element extending from the first U-shaped bolt; and
a second tie-down element extending from the second U-shaped bolt.

15. The system of claim 14, wherein the first and second tie-down elements are chains.

16. The system of claim 14, further comprising:
an item to be tied down, wherein at least one of the first and second tie-down elements secures the item and prevents movement during transport thereof.

17. A method of securing an item for transport comprising the steps of:
providing an item to be secured for transport;
providing a tie-down element and securing the item with the tie-down element;
connecting a compression apparatus to the tie-down element, said compression apparatus comprising:
a body formed by a first U-shaped bolt and a second U-shaped bolt disposed in an inverted position relative to the first U-shaped bolt, the body having a first end and a second end, wherein a first cap is disposed at the first end, a second cap is disposed at the second end and a first internal space is disposed between the first cap and the second cap, wherein legs of the first U-shaped bolt are disposed through the first cap and the second cap and further wherein the legs of the first U-shaped bolt are rigidly held to the second cap, wherein legs of the second U-shaped bolt are disposed through the second cap and the first cap and further wherein the legs of the second U-shaped bolt are rigidly held to the first cap;
a first compressible material within the first space between the first cap and the second cap, wherein the first compressible material comprises a first internal element and a second internal element, wherein the first internal element contributes to the compressibility of the compression apparatus at a first force applied to the compression apparatus and further wherein a combination of the first internal element and the second internal element contribute to the compressibility of the compression apparatus at a second force applied to the compression apparatus, wherein the first internal element has an open volume therein, and the second internal element is disposed in the open volume within the first internal element;
applying a first force to the compression apparatus, wherein the compression apparatus has a first compressibility at the first force; and
applying a second force to the compression apparatus, wherein the compression apparatus has a second compressibility at the second force that is a combination of the stiffness constants of the first and second internal elements.

18. The method of claim 17 wherein the first tie-down element is secured to a first end of the compression apparatus.

19. The method of claim 18 further comprising the steps of:
providing a second tie-down element; and
securing the second tie-down element to the compression apparatus.

20. The method of claim 19 wherein the second tie-down element is secured to a second end of the compression apparatus.

* * * * *